US012657546B2

(12) United States Patent
Fan et al.

(10) Patent No.: US 12,657,546 B2
(45) Date of Patent: Jun. 16, 2026

(54) SCALABLE REVIEW OF UAV DELIVERY ABORTS

(71) Applicant: Wing Aviation LLC, Palo Alto, CA (US)

(72) Inventors: Xinzhi Fan, San Mateo, CA (US); Ali Shoeb, San Rafael, CA (US)

(73) Assignee: Wing Aviation LLC, Palo Alto, CA (US)

( * ) Notice: Subject to any disclaimer, the term of this patent is extended or adjusted under 35 U.S.C. 154(b) by 45 days.

(21) Appl. No.: 18/809,095

(22) Filed: Aug. 19, 2024

(65) Prior Publication Data

US 2026/0050864 A1      Feb. 19, 2026

(51) Int. Cl.
| | |
|---|---|
| *G06Q 10/083* | (2024.01) |
| *G06V 10/26* | (2022.01) |
| *G06V 10/82* | (2022.01) |
| *G06V 20/17* | (2022.01) |

(52) U.S. Cl.
CPC ........... *G06Q 10/083* (2013.01); *G06V 10/26* (2022.01); *G06V 10/82* (2022.01); *G06V 20/17* (2022.01)

(58) Field of Classification Search
CPC ...... G06Q 10/083; G06V 10/26; G06V 10/82; G06V 20/17
See application file for complete search history.

(56) References Cited

U.S. PATENT DOCUMENTS

| | | | | |
|---|---|---|---|---|
| 9,459,620 | B1 * | 10/2016 | Schaffalitzky | ......... B64U 10/14 |
| 10,198,955 | B1 * | 2/2019 | Boyd | ................... G06Q 10/083 |
| 10,388,172 | B1 | 8/2019 | Boyd et al. | |

| | | | | |
|---|---|---|---|---|
| 10,922,984 | B1 | 2/2021 | Boyd et al. | |
| 11,610,493 | B1 | 3/2023 | Gilboa-Amir et al. | |
| 11,853,957 | B1 * | 12/2023 | Scalabrino | ............ G06N 20/00 |

(Continued)

OTHER PUBLICATIONS

Chen, Long, et al. "Real-time cross-view image matching and camera pose determination for unmanned aerial vehicles." Photogrammetric Engineering & Remote Sensing 90.6 (2024): 371-381. (Year: 2024).*

(Continued)

*Primary Examiner* — Michael P Harrington
*Assistant Examiner* — Brian A Tallman
(74) *Attorney, Agent, or Firm* — Christensen O'Connor Johnson Kindness PLLC

(57)      ABSTRACT

A technique for processing delivery aborts by a UAV delivery service includes: acquiring a delivery zone (DZ) image of a delivery destination including a DZ for a package being delivered to the delivery destination by a UAV; determining to abort a delivery mission for the package based upon the DZ image; converting the DZ image to a vector embedding; performing a similarity search on a vector database using the vector embedding, the vector database storing reference images of other delivery destinations indexed to reference vector embeddings and outcome attributes describing delivery outcomes associated with the reference images, and wherein the similarity search identifies a subset of the reference images deemed to have a threshold similarity to the DZ image; and prompting a vision language model with the DZ image and the subset of the reference images to provide an abort explanation or to determine a delivery disposition for the DZ.

20 Claims, 9 Drawing Sheets

(56) References Cited

U.S. PATENT DOCUMENTS

| | | | |
|---|---|---|---|
| 2004/0019494 A1* | 1/2004 | Ridgeway .......... | G06Q 30/0601 |
| | | | 705/26.1 |
| 2020/0219407 A1 | 7/2020 | Priest | |
| 2021/0374975 A1* | 12/2021 | Shoeb .................... | G06V 20/10 |
| 2022/0083964 A1* | 3/2022 | Silverstein ......... | G06Q 30/0282 |
| 2025/0103626 A1* | 3/2025 | Yoshimura ............ | G06F 16/587 |

OTHER PUBLICATIONS

Yao, Yuxuan et al., 'Can LLM Substitute Human Labeling? A Case Study of Fine-grained Chinese Address Entity Recognition Dataset for UAV Delivery,' arXiv:2403.06097v2 [cs.CL] Mar. 19, 2024, 5 pages.

Li, Xueping et al., 'Drone-Aided Delivery Methods, Challenge, and the Future: A Methodological Review,' MDPI, Mar. 2023, 7, 191 , 26 pages <https://doi.org/10.3390/drones7030191>.

PCT International Search Report and Written Opinion mailed Oct. 13, 2025, in corresponding International Application No. PCT/US2025/033977, 12 pages.

* cited by examiner

VECTOR DATABASE 400

| REFERENCE VECTOR EMBEDDINGS 405 | REFERENCE IMAGE 410 | OUTCOME ATTRIBUTE_1 (MISSION SUCCESS) | OUTCOME ATTRIBUTE_2 (OBSTRUCTION DETECTION TYPE) | OUTCOME ATTRIBUTE_3 (DZ TYPE) | OUTCOME ATTRIBUTE_4 (REASON) |
|---|---|---|---|---|---|
| VECTOR EMBEDDING_1 | REFERENCE IMAGE_1 | DELIVERED | TRUE NEGATIVE | DRIVEWAY | DZ CLEAR |
| VECTOR EMBEDDING_2 | REFERENCE IMAGE_2 | ABORTED | FALSE POSITIVE | WALK PATH | SHADOW DEEMED POWERLINE |
| VECTOR EMBEDDING_3 | REFERENCE IMAGE_3 | ABORTED | TRUE POSITIVE | DRIVEWAY | CAR OBSTRUCTED DZ |
| VECTOR EMBEDDING_4 | REFERENCE IMAGE_4 | ABORTED | TRUE POSITIVE | DRIVEWAY | POWERLINE OVER DZ |
| VECTOR EMBEDDING_5 | REFERENCE IMAGE_5 | DELIVERED | TRUE POSITIVE | PATIO | OVERHEAD LIGHT OBSTRUCTING DZ |
| ⋯ | ⋯ | ⋯ | ⋯ | ⋯ | ⋯ |
| VECTOR EMBEDDING_N | REFERENCE IMAGE_N | | | | |

SCALABLE REVIEW OF UAV DELIVERY ABORTS

TECHNICAL FIELD

This disclosure relates generally to unmanned aerial vehicle (UAV) delivery services, and in particular but not exclusively, relates to managing aborted deliveries by UAVs of a UAV delivery service.

BACKGROUND INFORMATION

An unmanned vehicle, which may also be referred to as an autonomous vehicle, is a vehicle capable of traveling without a physically present human operator. Various types of unmanned vehicles exist for various different environments. For instance, unmanned vehicles exist for operation in the air, on the ground, underwater, and in space. Unmanned vehicles also exist for hybrid operations in which multi-environment operation is possible. Unmanned vehicles may be provisioned to perform various missions, including payload delivery, exploration/reconnaissance, imaging, public safety, surveillance, or otherwise. The mission definition will often dictate a type of specialized equipment and/or configuration of the unmanned vehicle.

Unmanned aerial vehicles (also referred to as drones) can be adapted for package delivery missions to provide an aerial delivery service. One type of unmanned aerial vehicle (UAV) is a vertical takeoff and landing (VTOL) UAV. VTOL UAVs are particularly well-suited for package delivery missions. The VTOL capability enables a UAV to takeoff and land within a small footprint thereby providing package pick-ups and deliveries almost anywhere.

To safely deliver packages in a variety of environments (particularly environments of first impression or populated urban/suburban environments), the UAV should be capable of effectively identifying and avoiding ground-based obstacles. In some situations, the UAV will abort a delivery mission when its onboard systems determine a delivery zone (DZ) is unavailable. These situations are referred to as delivery aborts. Delivery aborts can be triggered for many reasons, some transient (e.g., a car parked in the DZ) and some more permanent. A delivery abort is disruptive to the user experience (UX). In most situations, mission aborts are justified; however, in other situations, a mission abort may be the result of a false positive detection of an obstacle. As such, it is important to review mission logs of aborted missions to identify aborts that are the result of false positive obstacle detections and learn from those mistakes to improve the reliability, deliverability, and UX of the UAV delivery service.

BRIEF DESCRIPTION OF THE DRAWINGS

Non-limiting and non-exhaustive embodiments of the invention are described with reference to the following figures, wherein like reference numerals refer to like parts throughout the various views unless otherwise specified. Not all instances of an element are necessarily labeled so as not to clutter the drawings where appropriate. The drawings are not necessarily to scale, emphasis instead being placed upon illustrating the principles being described.

FIG. 4A illustrates an example vector database storing reference images of delivery destinations indexed to vector embeddings and outcome attributes, in accordance with an embodiment of the disclosure.

DETAILED DESCRIPTION

Figure 1A:
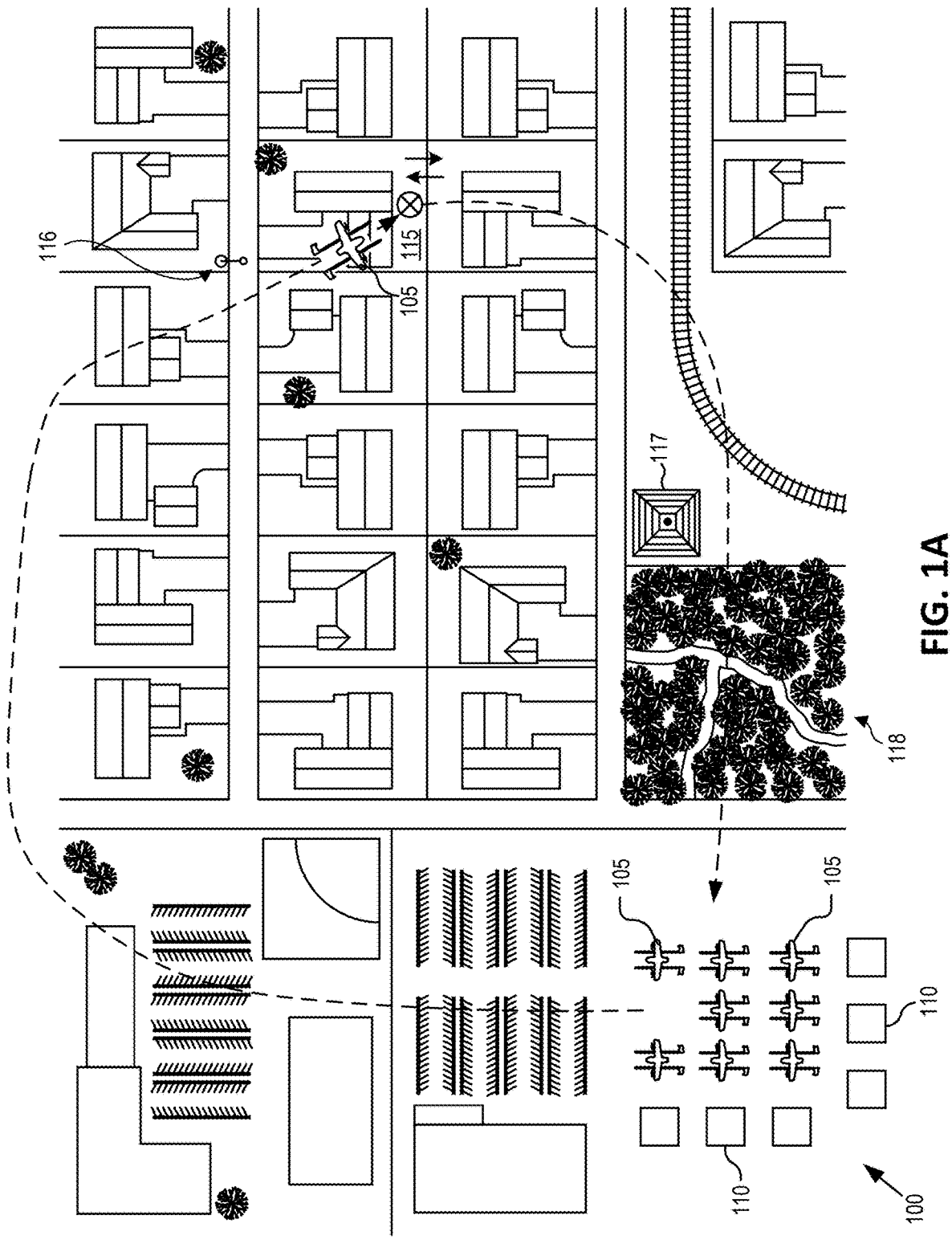
FIG. 1A illustrates operation of an unmanned aerial vehicle (UAV) delivery service that delivers packages into a neighborhood, in accordance with an embodiment of the disclosure.

Embodiments of a system, apparatus, and method of operation for scalable processing of delivery aborts by an unmanned aerial vehicle (UAV) delivery service are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Embodiments disclosed herein describe a technique for processing (e.g., reviewing and learning from) delivery aborts by a UAV delivery service are described. The proposed technique leverages a vision language model (VLM) and a vector database to examine delivery aborts with minimal latency. Conventionally, a human operator reviews mission logs associated with delivery aborts, and then makes case-by-case decisions whether the delivery abort was the result of a justified obstruction detection (true positive) or an unjustified obstruction detection (false positive). The human operator could then provide an abort explanation to the end customer and determine a delivery disposition for delivery destination (e.g., future deliveries are blocked, permitted, etc.). While human supervision and intervention is feasible with small scale operations, it does not scale well as UAV deliveries become more common. Mission aborts, and in particular delivery aborts, are particularly harmful to the user experience (UX). While human review and remedial action on a case-by-case basis may have a high accuracy outcome, it can have significant latency and cost detracting from the UX.

In response to a delivery abort, the disclosed embodiments transmit the delivery zone (DZ) image (or encoding thereof) acquired by the UAV during the delivery abort to the backend management system. The backend management system converts the DZ image to a vector embedding suitable for performing a similarity search. The similarity search is performed on a vector database storing reference images of other delivery destinations indexed to reference vector embeddings and outcome attributes. The outcome attributes describe delivery outcomes (e.g., package delivered or delivery aborted, true/false obstruction detection, DZ type, reason for abort, etc.) associated with the reference images. The similarity search identifies a subset of the reference images deemed to have a threshold similarity (e.g., top twenty reference images believed to be most similar with the DZ image acquired by the UAV). The DZ image along with the subset of reference images and outcome attributes are then assembled into a prompt for querying a VLM. The subset of reference images and outcome attributes provide relevant in-context learning to the VLM to generate an automated abort explanation and determine a delivery disposition for the DZ at the delivery destination.

Use of a VLM is both scalable and can generate the abort explanation and delivery disposition with low latency. The abort explanation and/or delivery disposition can then be provided to the end customer for their review and feedback. If the VLM abort explanation and delivery disposition, in optional consultation with the end customer, determine that the delivery abort was a mistake, then the delivery mission can be quickly rescheduled. In some embodiments, an alternative DZ at the delivery destination can be quickly negotiated with the customer for rescheduling the delivery mission. In yet other situations, a false positive disposition may be used to reopen future deliveries to the specific delivery destination with specialized instructions to avoid future erroneous aborts (e.g., adjust thresholds or biases associated with shadow detections, down weight powerline detections, etc.). However, if the delivery disposition associated with the delivery destination is deemed to be undeliverable, then future delivery requests to the delivery destination may be blocked.

The data learned from the VLM and customer feedback may be used to not only improve (or block) future deliveries to the specific delivery destination, but also used to update the vector database with new delivery abort edge cases and even to generate training data with automated ground truth data for training various machine learning (ML) models used throughout the UAV delivery service. These and other benefits are described in further detail below.

FIG. 1A illustrates operation of a UAV service supplier (USS), such as a UAV delivery service, which delivers packages into a neighborhood, in accordance with an embodiment of the disclosure. UAVs may one day routinely deliver items into urban or suburban neighborhoods from small regional or neighborhood hubs such as terminal area 100 (also referred to as a local nest or staging area). Vendor facilities that wish to take advantage of the aerial delivery service may set up adjacent to terminal area 100 (such as vendor facilities 110) or be dispersed throughout the neighborhood for waypoint package pickups (not illustrated). An example aerial delivery mission may include multiple mission phases such as takeoff from terminal area 100 with a package for delivery to delivery destination 115 (e.g., customer address), rising to a cruising altitude, and cruising to the delivery destination.

Figure 1B:
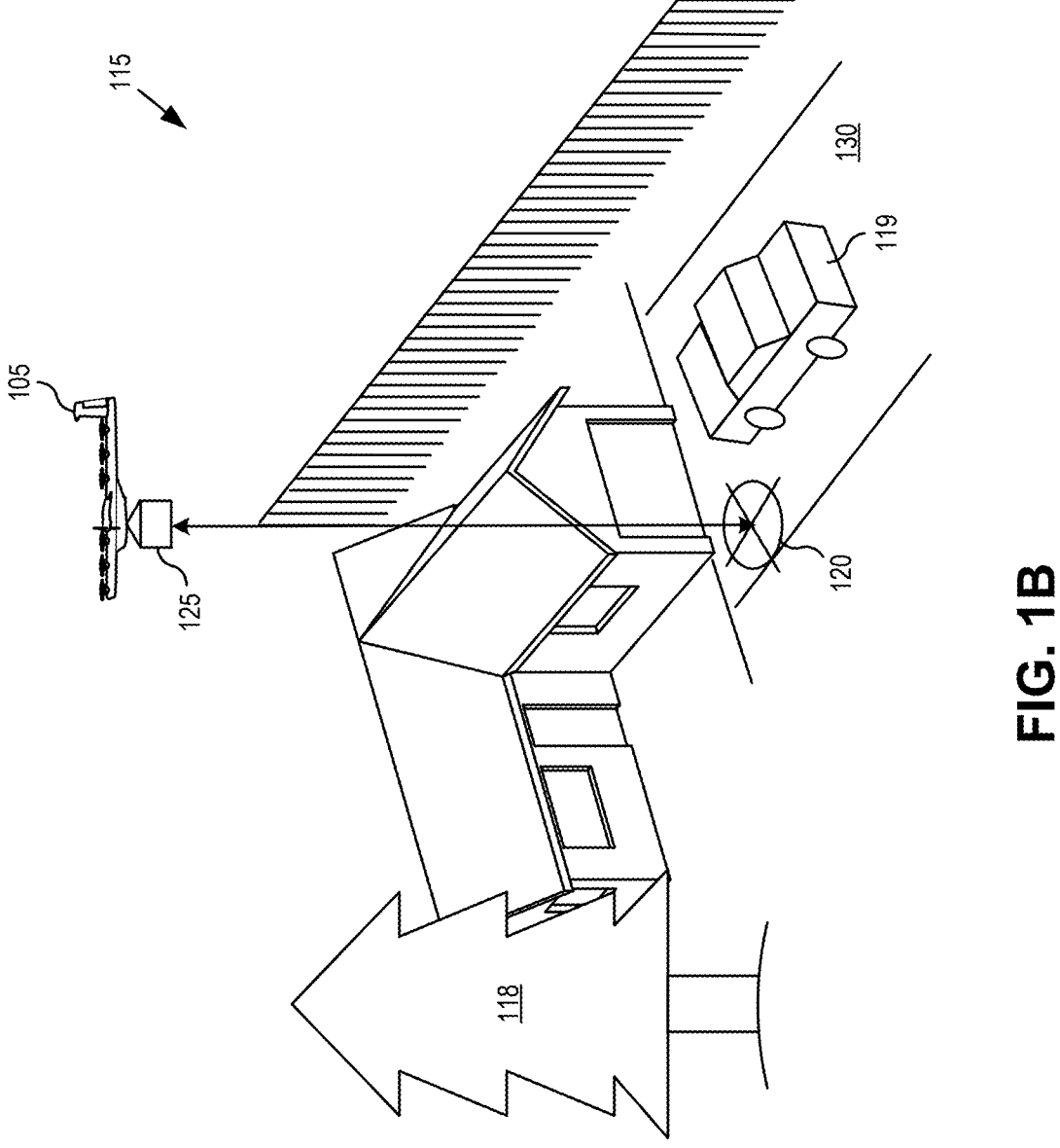
FIG. 1B illustrates a package drop-off at a delivery destination, in accordance with an embodiment of the disclosure.

Turning to FIG. 1B, at delivery destination 115, UAV 105 captures aerial images of delivery destination 115 to understand the scene below and identify obstacles to avoid (e.g., ground-based obstacles such as cars, trees, powerlines, streetlights, etc.) and a location for safe package drop-off at delivery destination 115, referred to as the delivery zone (DZ) 120. The aerial image of the delivery destination including DZ 120 is referred to herein as the DZ image. The DZ image is semantically analyzed by a neural network (e.g., semantic segmentation model) disposed on board UAV 105 to acquire an initial understanding of the scene. The semantic analysis produces a semantic segmentation, which categorizes each pixel, group of pixels, or feature in the image into a class or object. Based on this semantic analysis, other onboard algorithms/models may further analyze the scene to identify shadows (shadow detection algorithms), detect powerlines (powerline detection algorithms), or otherwise. If these algorithms determine the presence of an obstacle (e.g., streetlights 116, telephone poles, radio towers 117, cranes, trees 118, a car 119, etc.) or lacks confidence in identification of an available DZ 120, then UAV 105 may abort the delivery, rise back up to a safe cruising altitude, and return to terminal area 100 without delivering package 125. For example, in FIG. 1B, UAV 105 may determine from the DZ image that car 119 parked on driveway 130 is obstructing DZ 120 and therefore cannot safely deliver package 125. As such, UAV 105 transmits the DZ image (which may be an efficient encoding thereof) to the backend management system of the UAV delivery service with a delivery abort flag asserted.

Figure 2:
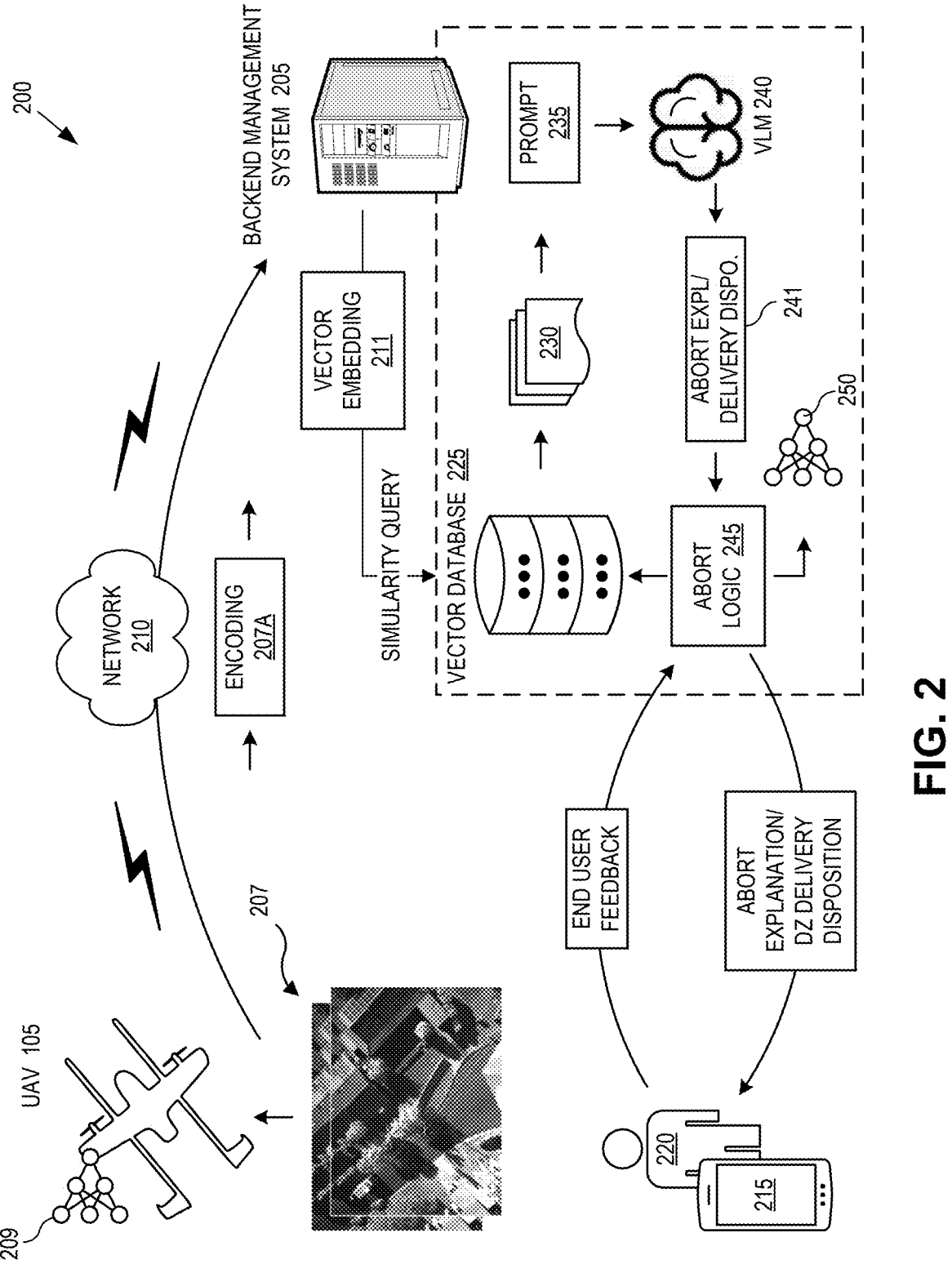
FIG. 2 is a functional block diagram illustrating relevant components of a UAV delivery system for scalable review of delivery aborts, in accordance with an embodiment of the disclosure.

FIG. 2 is a functional block diagram illustrating relevant components of a UAV delivery system 200 for scalable review/processing of delivery aborts, in accordance with an embodiment of the disclosure. The illustrated embodiment of system 200 includes a fleet of UAVs 105 that capture DZ images 207 and communicate with backend management system 205 over a wireless network 210 (e.g., cellular network, LTE, WiFi, etc.). In one embodiment, each DZ image 207 is communicated as an efficient encoding 207A to conserve bandwidth over network 210. System 200 further includes a mobile application or website 215 for communicating with customers 220. Backend management system 205 maintains a vector database 225 for storing reference images indexed to reference vector embeddings and outcome attributes. Subsets 230 retrieved from vector database 225 in response to a similarity search are used to populate a prompt 235 for querying VLM 240. VLM 240 may be a proprietary model stored locally or in the cloud, or a multimodal large language model available from a third-party provider.

Figure 3A:
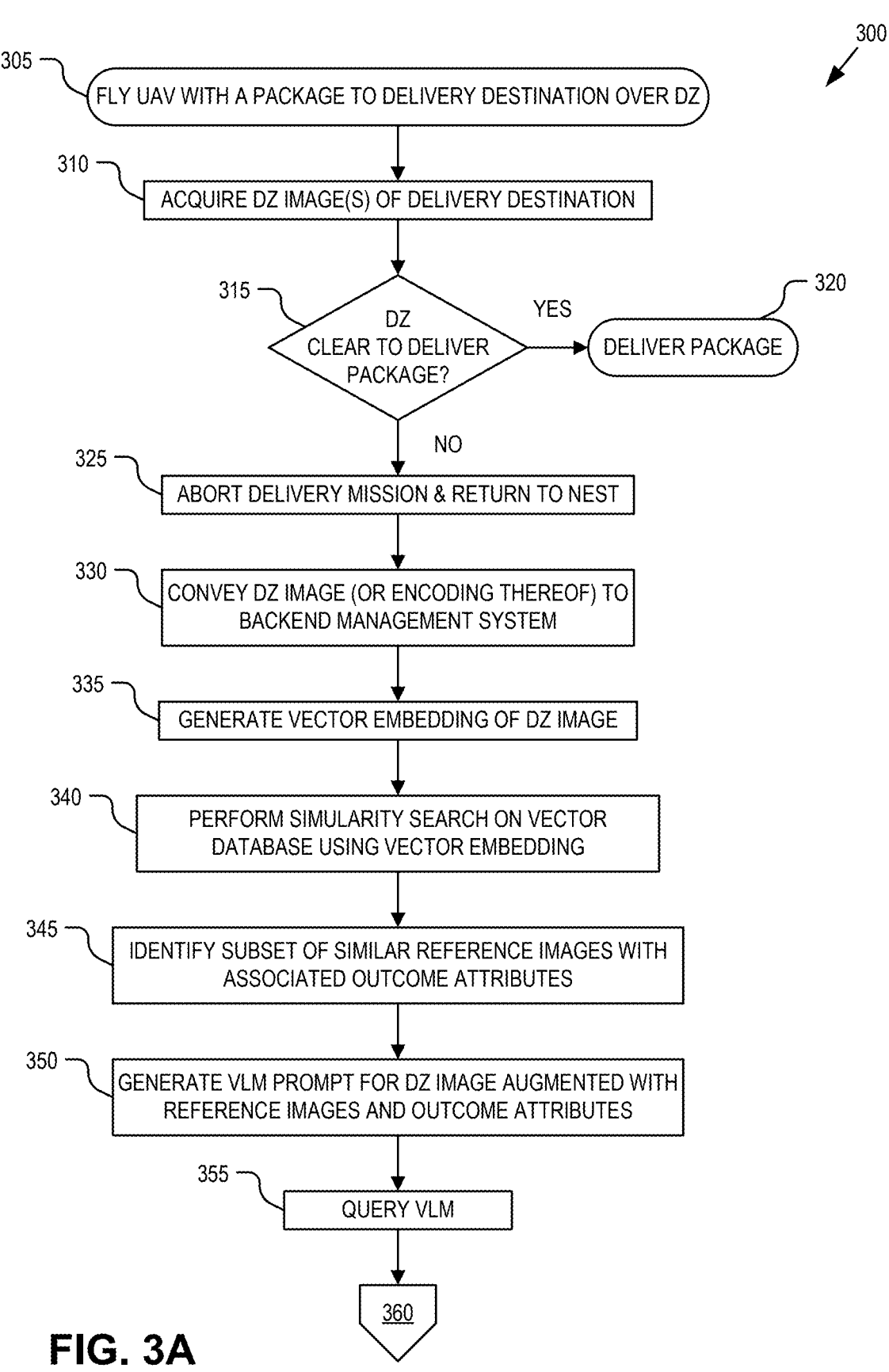
FIGS. 3A & 3B is a flow chart illustrating a process for managing delivery aborts in an automated and scalable manner, in accordance with an embodiment of the disclosure.
Figure 3B:
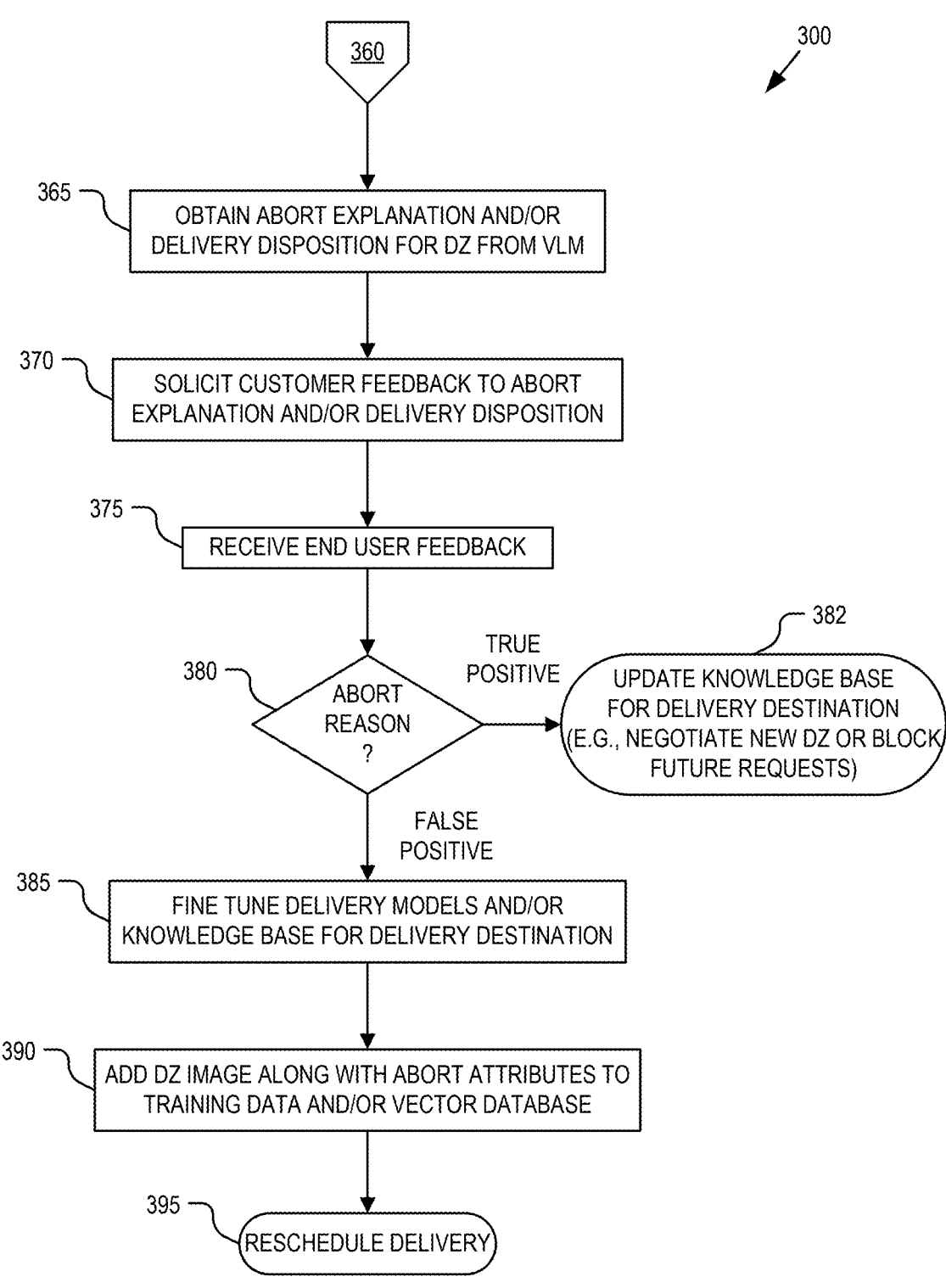

FIGS. 3A & 3B are a flow chart illustrating a process 300 for automated handling/reviewing of delivery aborts by UAVs 105, in accordance with an embodiment of the disclosure. Process 300 is described with reference to FIGS. 2 and 4A-C. The order in which some or all of the process blocks appear in process 300 should not be deemed limiting. Rather, one of ordinary skill in the art having the benefit of the present disclosure will understand that some of the process blocks may be executed in a variety of orders not illustrated, or even in parallel.

In a process block 305, UAV 105 flies to delivery destination 115 carrying package 125 and hovers over DZ 120. Once hovering above DZ 120, UAV 115 captures one or more DZ images 207 with its onboard camera system (processing block 310) and analyzes DZ image 207 to determine whether DZ 120 is clear and safe for delivery of package 125 (decision block 315). Onboard logic 209, such as a semantic segmentation model, may be used to analyze DZ image 207 and determine whether to deliver or abort. If DZ 120 is determined to be clear, then UAV 105 proceeds to process block 320, drops off package 125, and returns to terminal area 100. If logic 209 determines an obstruction is preventing a safe delivery of package 125 to DZ 120, then UAV 105 aborts the delivery mission and carries package 125 back to terminal area 100 (e.g., local nest) in a process block 325.

Once a delivery abort has occurred, UAV 105 conveys DZ image 207 to backend management system 205 over network 210 (process block 330). In one embodiment, the upload of DZ image 207 may be immediate via a cellular communication channel (e.g., LTE) while UAV 105 is hovering over DZ 120 or enroute back to the local nest. In other embodiments, the upload of DZ image 207 is delayed until UAV 105 returns to the local nest. In either case, uploading DZ image 207 may be achieved by uploading an efficient encoding 207A using a compression algorithm, autoencoder, or otherwise to conserve bandwidth over network 210.

The uploaded encoding 207A of DZ image 207 is converted into a vector embedding 211 by backend management system 205 (process block 335). Vector embedding 211 is a numerical representation of DZ image 207 that is readily manipulated to perform a similarity search using distance calculations in a vector space. Vector embedding 211 may be generated using various encoders (e.g., convolutional neural network, autoencoder, ML networks, etc.) optimized for similarity searching. In the illustrated embodiment, vector embedding 211 is a translation/conversion of DZ image 207 into a proximity vector space that is optimized for semantic similarity searches. In a processing block 340, vector embedding 211 is used to perform such a similarity search on vector database 225. Vector database 225 stores reference images of other delivery destinations indexed to reference vector embeddings and outcome attributes describing delivery outcomes associated with the reference images. In other words, vector database 400 is a repository of reference DZ images and associated outcome attributes, which operate as ground truth data describing the outcomes of delivery attempts to each delivery destination imaged by the reference DZ images.

FIG. 4A illustrates an example vector database 400, in accordance with an embodiment of the disclosure. Vector database 400 is one possible implementation of vector database 225 illustrated in FIG. 2. As illustrated in FIG. 4A, vector database 400 includes reference images 410 indexed to reference vector embeddings 405 for performing the similarity search and various outcome attributes 415 describing the associated reference image 410. The illustrated embodiment of outcome attributes 415 includes a mission success attribute, an obstruction detection type attribute, a DZ type attribute, and a reason attribute. For example, reference image_1 illustrated in FIG. 4A is a reference DZ image where the UAV was able to deliver its package (outcome attribute_1) to a driveway (outcome attribute_3) that was validly deemed clear (outcome attribute_4="true negative") and the package was delivered because no obstruction was detected in the DZ (outcome attribute_4). Correspondingly, reference image_2 is a reference DZ image where the UAV did not deliver its package (outcome attribute_1="aborted") to a walk path (outcome attribute_3) that was falsely deemed obstructed (outcome attribute_2="false positive") and the false positive obstruction was subsequently determined to be a shadow erroneously classified as a powerline (outcome attribute_4). Reference image_3 is a reference DZ image where the UAV did not deliver its package (outcome attribute_1="aborted") to a driveway (outcome attribute_3) that was correctly deemed obstructed (outcome attribute_2="true positive") and the true positive obstruction was subsequently determined to be a car parked in the driveway (outcome attribute_4). The outcome attributes 415 illustrated in FIG. 4A are merely examples, and other types of outcome attributes may be added and/or substituted with the illustrated examples.

Returning to FIG. 3A, the similarly search identifies a subset 230 of reference images 410 deemed to have a threshold similarity with DZ image 207 (process block 345). The threshold similarly may be the top N (e.g., 10 or 20) closest reference vector embeddings 405 using a multidimensional distance calculation. In other embodiments, the threshold similarity may additionally require specific thresholds and/or characteristics to quality as a similar DZ image and thus be included in subset 230.

Subset 230 is packaged with DZ image 207 (or an encoding thereof) to generate a prompt 235 (process block 350) for querying VLM 240 (process block 355). In one embodiment, prompt 235 asks VLM 240 to review DZ image 207, along with subset 230 of the reference images and outcome attributes as an in-context learning dataset, and provide an abort explanation for DZ image 207 and/or determine a delivery disposition for DZ 120. In other words, VLM 240 is prompted to explain in human language terms why UAV 105 aborted the delivery and whether future deliveries to DZ 120 at delivery destination 115 should be blocked (true positive obstruction was detected by UAV 105), permitted (false positive obstruction was detected by UAV 105), or modified. A modified delivery disposition may include a determination that a false positive obstruction was detected due to a shadow that looks like a powerline and future delivery attempts should disable or down weight the onboard shadow detection algorithms of UAVs 105. Another example of a modified delivery disposition may include, a true positive obstruction was detected due to a car parked in the driveway, but a reattempt should be tried when the car is gone or the lawn area next to the driveway may serve as an acceptable alternative DZ when an obstruction is detected on the driveway. Prompt 235 may assume a variety of formats and include a variety of information; however, some constituent elements of prompt 235 may include: 1) DZ image 207 (or encoding thereof), 2) the in-context learning dataset including subset 230, 3) inform VLM 240 that the query is coming from, or related to, a UAV trying to deliver a package to the location imaged in DZ image 207, 4) describe a delivery policy to VLM 235, 5) provide VLM 240 with multiple choice answers describing possible delivery dispositions and/or abort explanations, and 6) ask VLM 240 to select the best multiple choice answer and explain its reasoning. Of course, other formats and constituent elements may also be used.

Figure 4B:
FIG. 4B illustrates reference images of delivery destinations including delivery zones stored in the vector database, in accordance with an embodiment of the disclosure.
Figure 4B:
Figure 4B:
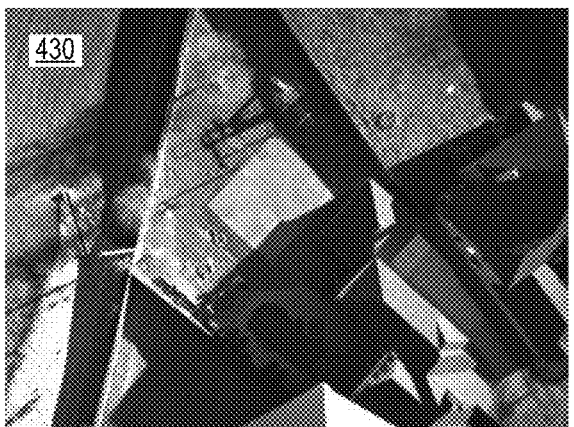
Figure 4C:
FIG. 4C illustrates a delivery zone (DZ) image acquired by a UAV hovering over a delivery destination, in accordance with an embodiment of the disclosure.

FIGS. 4B and 4C help illustrate an example prompt 235 to VLM 240. In particular, FIG. 4B illustrates an example subset 230 of three reference images 420, 425, and 430 while FIG. 4C illustrates an example of DZ image 207. The outcome attributes associated with reference images 420-430 may indicate reference image 420 is an example of a delivery zone resulting in a valid abort due to a powerline, reference image 425 is an example of a delivery zone resulting in a valid abort due to a powerline, and reference image 430 is an example of a delivery zone where a powerline does not and should not impact delivery. The example prompt 235 may include: "Consider image 435 in light of reference images 420, 425, and 430. A UAV delivering a package to this front yard aborted its delivery because its sensors detected an obstacle. What type of obstacle did the UAV detect? Should future deliveries be blocked or reattempted? Explain your reasoning." In yet another embodiment, prompt 235 may ask VLM 240 to pick an explanation from a list of options such as: "A) the delivery zone makes contact with a building, B) the delivery zone makes contact with a tree, C) the delivery zone makes contact with a powerline, D) the delivery zone makes contact with water in a pool, E) the drone should not abort the delivery as the delivery zone is clear."

Turning to a process block 365 in FIG. 3B via off page reference 360, VLM 240 outputs its response 241 to prompt 235. Response 241 may include one or both of an abort explanation or a delivery disposition for DZ 120 at delivery destination 115. In the example illustrated in FIGS. 4B & C, an example response 241 may include, "The powerline running diagonally across the top of the image is the most likely explanation for the UAV aborting its delivery. While the UAV's sensors may have also detected the trees and the parked car, those obstacles are not as likely to cause the UAV to abort its mission. The UAV may be programmed to avoid powerlines at all costs because powerlines can be dangerous to UAVs."

In a process block 370, customer feedback to the abort explanation and/or delivery disposition may be solicited. Solicitation of customer feedback may include informing customer 220, via mobile application or website 215, that the delivery mission was aborted, provide the abort explanation and/or the delivery disposition, and solicit feedback from customer 220 on the abort explanation or the delivery disposition (process block 375). The solicitation for customer feedback may also take the form of multiple-choice options describing the abort explanation or delivery disposition. For example, the multiple-choice options could include: A) I agree with the abort explanation or B) I disagree with the abort explanation. The multiple-choice options may be nested multiple choices where additional choices are presented to customer 220 dependent upon their feedback.

If the combination of the abort explanation and delivery disposition, along with the customer feedback, suggests to abort logic 245 (e.g., an independent ML model, a stateful dialog with VLM 240, a heuristic, etc.) that the abort was a true positive (decision block 380), then process 300 continues to a process block 382. In process block 382, the delivery disposition may be used to update a fleet delivery status associated with delivery destination 115. For example, the fleet delivery status may be set to block future UAV deliveries to delivery destination 115 or negotiate an alternative DZ at delivery destination 115 with customer 220 for future deliveries.

If the combination of the abort explanation and delivery disposition, along with the customer feedback, suggests to abort logic 245 that the abort was a false positive (decision block 380), then process 300 continues to a process block 385. In process block 385, the delivery explanation, delivery disposition, and even customer feedback may be used to fine tune delivery models and the UAV delivery service's knowledge base related to delivery destination 115. For example, a fleet delivery status or a fleet delivery protocol associated with delivery destination 115 may be updated based on the abort explanation and/or the delivery disposition. An example update to the fleet delivery protocol associated with delivery destination 115 may include changing a detection threshold or a detection bias associated with a semantic segmentation model operating onboard UAVs 105 when delivery future packages to delivery destination 115. An example change of the detection threshold or detection bias of a semantic segmentation model may include down weighting powerline detections by the semantic segmentation model when UAVs 105 are above DZ 120 at delivery destination 115. Another example may be to adjust the sensitivity of a shadow detection algorithm. Of course, the thresholds or bias of other obstacle detection and navigation algorithms/models may be adjusted on a per delivery destination basis in response to false positive obstacle detections.

In addition to updating a fleet delivery status or a fleet delivery protocol associated with delivery destination 115, DZ image 207 and vector embedding 211 may be stored for other uses (process block 390). For example, DZ image 207 and vector embedding 211 may be added into vector database 225 as a new edge case to inform future VLM queries. The abort explanation and/or delivery disposition from VLM 240, optionally along with customer feedback, may be used to create the outcome attributes associated with this new entry added into vector database 225. Furthermore, DZ image 207 may be added to a training database storing training images for training other models used by the UAV delivery service. These models may include onboard models/logic 209 or backend models/logic 250. The abort explanation and/or delivery disposition may be used to label DZ image 207 with one or more ground truth labels.

In the event that VLM 240 determines that the delivery abort was the result of a false positive obstruction detection (decision block 380), the UAV delivery service may inform customer 220 that the abort was a mistake and automatically reschedule the package delivery (process block 395).

Figure 5A:
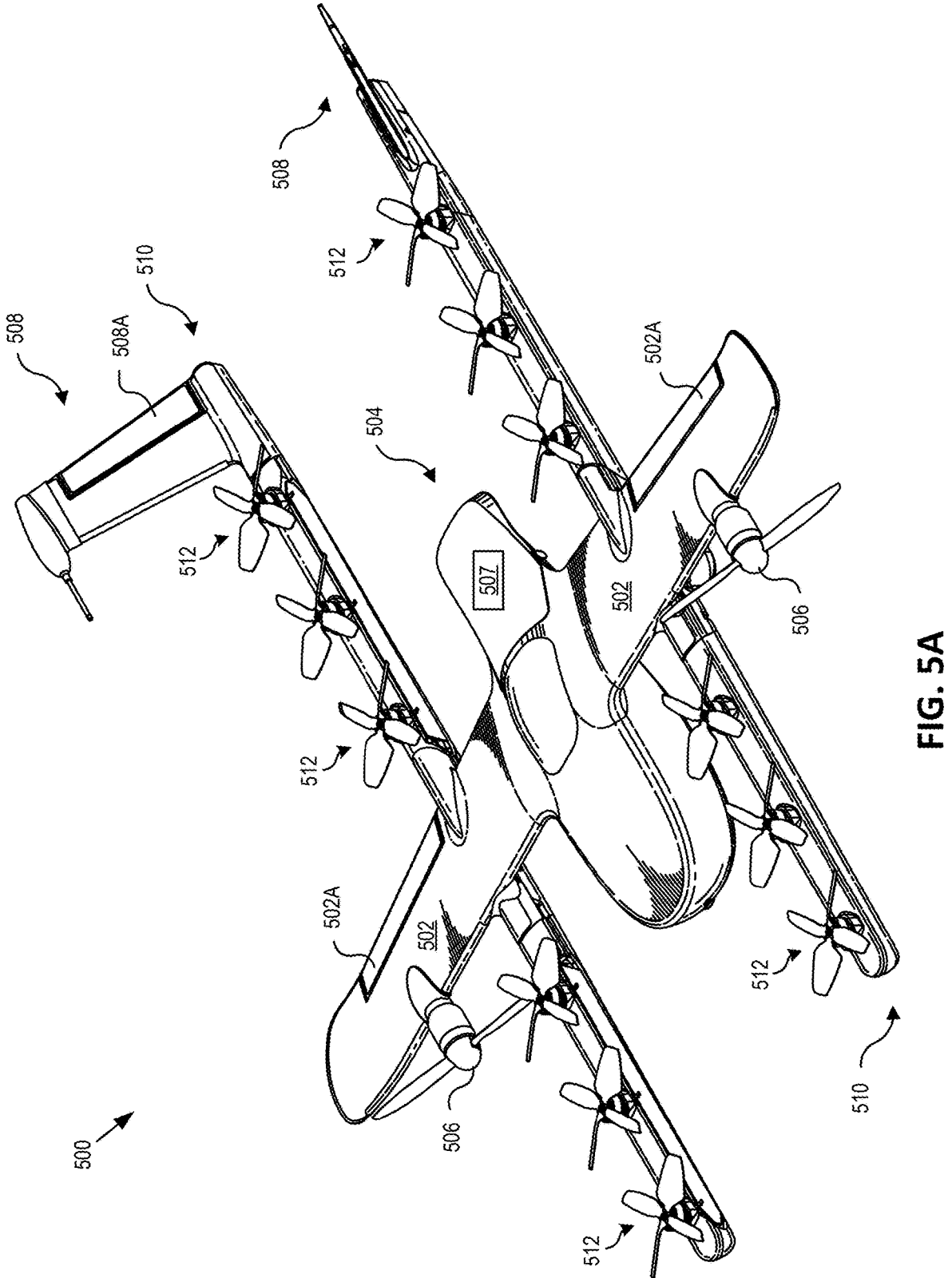
FIG. 5A is a perspective view illustration of a UAV configured for use in a UAV delivery system, in accordance with an embodiment of the disclosure.
Figure 5B:
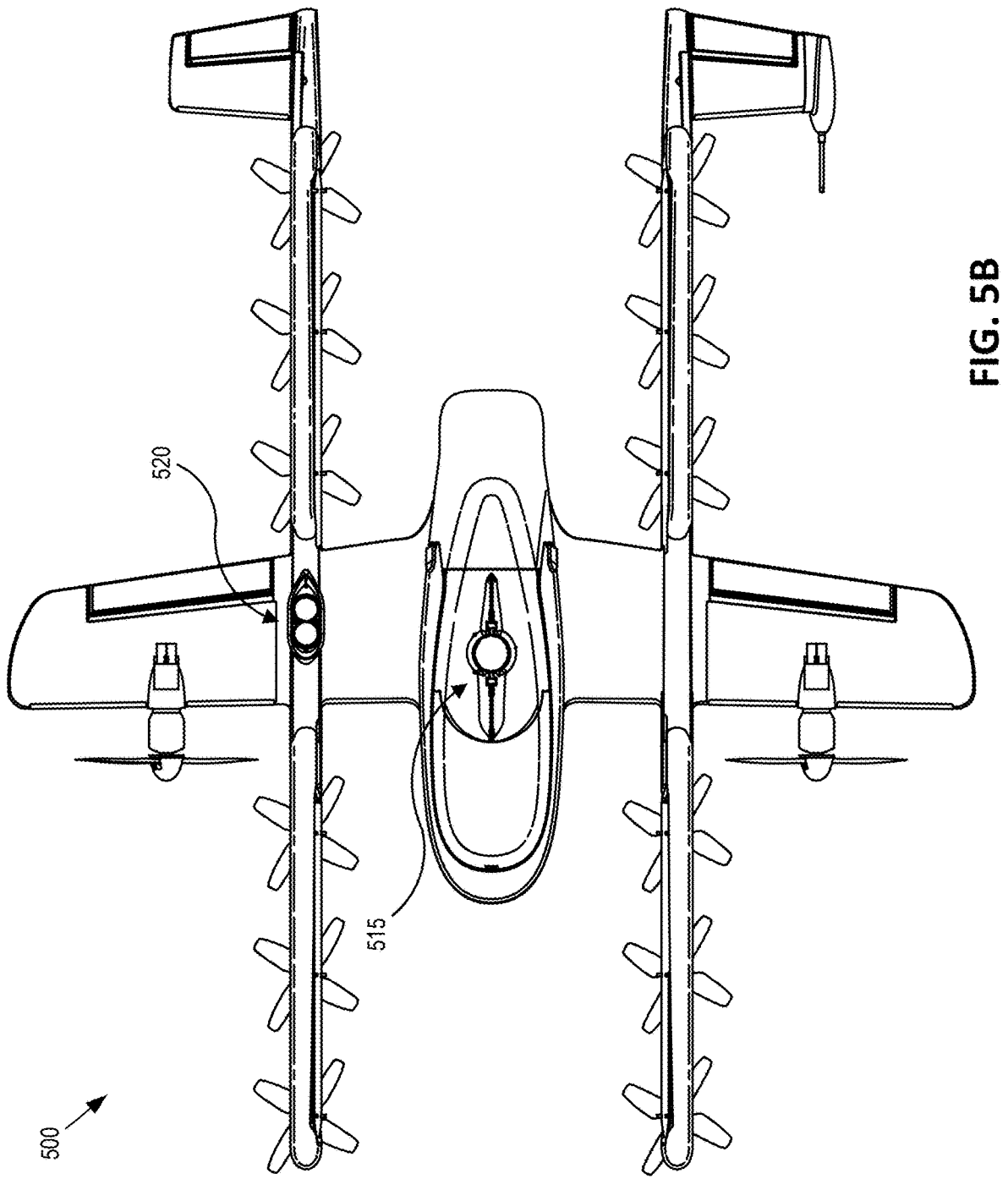
FIG. 5B is an underside plan view illustration of the UAV configured for use in the UAV delivery system, in accordance with an embodiment of the disclosure.

FIGS. 5A and 5B illustrate a UAV 500 that is well-suited for delivery of packages, in accordance with an embodiment of the disclosure. FIG. 5A is a topside perspective view illustration of UAV 500 while FIG. 5B is a bottom side plan view illustration of the same. UAV 500 is one possible implementation of UAVs 105 illustrated in FIG. 1, although other types of UAVs may be implemented for a UAV delivery service as well.

The illustrated embodiment of UAV 500 is a vertical takeoff and landing (VTOL) UAV that includes separate propulsion units 506 and 512 for providing horizontal and vertical propulsion, respectively. UAV 500 is a fixed-wing aerial vehicle, which as the name implies, has a wing assembly 502 that can generate lift based on the wing shape and the vehicle's forward airspeed when propelled horizontally by propulsion units 506. The illustrated embodiment of UAV 500 has an airframe that includes a fuselage 504 and wing assembly 502. In one embodiment, fuselage 504 is modular and includes a battery module, an avionics module, and a mission payload module. These modules are secured together to form the fuselage or main body.

The battery module (e.g., fore portion of fuselage 504) includes a cavity for housing one or more batteries for powering UAV 500. The avionics module (e.g., aft portion of fuselage 504) houses flight control circuitry of UAV 500, which may include a processor and memory, communication electronics and antennas (e.g., cellular transceiver, wifi transceiver, etc.), and various sensors (e.g., GNSS sensor, an inertial measurement unit, a magnetic compass, a radio frequency identifier reader, etc.). Collectively, these functional electronic subsystems for controlling UAV 500, communicating, and sensing the environment may be referred to as a control system 507. The mission payload module (e.g., middle portion of fuselage 504) houses equipment associated with a mission of UAV 500. For example, the mission payload module may include a payload actuator 515 (see FIG. 5B) for holding and releasing an externally attached payload (e.g., package for delivery). In some embodiments, the mission payload module may include camera/sensor equipment (e.g., camera, lenses, radar, lidar, pollution monitoring sensors, weather monitoring sensors, scanners, etc.). In FIG. 5B, an onboard camera 520 (e.g., onboard camera system 205) is mounted to the underside of UAV 500 to support a computer vision system (e.g., stereoscopic machine vision) for visual triangulation and navigation as well as operate as an optical code scanner for reading visual codes affixed to packages. These visual codes may be associated with or otherwise match to delivery missions and provide the UAV with a handle for accessing destination, delivery, and package validation information. Of course, onboard camera 520 may alternatively be integrated within fuselage 504.

As illustrated, UAV 500 includes horizontal propulsion units 506 positioned on wing assembly 502 for propelling UAV 500 horizontally. UAV 500 further includes two boom assemblies 510 that secure to wing assembly 502. Vertical propulsion units 512 are mounted to boom assemblies 510. Vertical propulsion units 512 providing vertical propulsion. Vertical propulsion units 512 may be used during a hover mode where UAV 500 is descending (e.g., to a delivery zone), ascending (e.g., at initial launch or following a delivery), or maintaining a constant altitude. Stabilizers 508 (or tails) may be included with UAV 500 to control pitch and stabilize the aerial vehicle's yaw (left or right turns) during cruise. In some embodiments, during cruise mode vertical propulsion units 512 are disabled or powered low and during hover mode horizontal propulsion units 506 are disabled or powered low.

During flight, UAV 500 may control the direction and/or speed of its movement by controlling its pitch, roll, yaw, and/or altitude. Thrust from horizontal propulsion units 506 is used to control air speed. For example, the stabilizers 508 may include one or more rudders 508a for controlling the aerial vehicle's yaw, and wing assembly 502 may include elevators for controlling the aerial vehicle's pitch and/or ailerons 502a for controlling the aerial vehicle's roll. While the techniques described herein are particularly well-suited for VTOLs providing an aerial delivery service, it should be appreciated that the techniques described herein are generally applicable to a variety of aircraft types (not limited to VTOLs) providing a variety of services or serving a variety of functions beyond package deliveries.

Many variations on the illustrated fixed-wing aerial vehicle are possible. For instance, aerial vehicles with more wings (e.g., an "x-wing" configuration with four wings), are also possible. Although FIGS. 5A and 5B illustrate one wing assembly 502, two boom assemblies 510, two horizontal propulsion units 506, and six vertical propulsion units 512 per boom assembly 510, it should be appreciated that other variants of UAV 500 may be implemented with more or less of these components.

It should be understood that references herein to an "unmanned" aerial vehicle or UAV can apply equally to autonomous and semi-autonomous aerial vehicles. In a fully autonomous implementation, all functionality of the aerial vehicle is automated; e.g., pre-programmed or controlled via real-time computer functionality that responds to input from various sensors and/or pre-determined information. In a semi-autonomous implementation, some functions of an aerial vehicle may be controlled by a human operator, while other functions are carried out autonomously. Further, in some embodiments, a UAV may be configured to allow a remote operator to take over functions that can otherwise be controlled autonomously by the UAV. Yet further, a given type of function may be controlled remotely at one level of abstraction and performed autonomously at another level of abstraction. For example, a remote operator may control high level navigation decisions for a UAV, such as specifying that the UAV should travel from one location to another (e.g., from a warehouse in a suburban area to a delivery address in a nearby city), while the UAV's navigation system autonomously controls more fine-grained navigation decisions, such as the specific route to take between the two locations, specific flight controls to achieve the route and avoid obstacles while navigating the route, and so on.

The processes explained above are described in terms of computer software and hardware. The techniques described may constitute machine-executable instructions embodied within a tangible or non-transitory machine (e.g., computer) readable storage medium, that when executed by a machine will cause the machine to perform the operations described. Additionally, the processes may be embodied within hardware, such as an application specific integrated circuit ("ASIC") or otherwise.

A machine-readable storage medium includes any mechanism that stores information in a non-transitory form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A computer implemented method for processing delivery aborts by a unmanned aerial vehicle (UAV) delivery service, the computer implemented method comprising:
acquiring a delivery zone (DZ) image by a UAV of the UAV delivery service, wherein the DZ image is of a delivery destination including a DZ for delivering a package to the delivery destination;
determining to abort a delivery mission for the package prior to delivering the package based upon the DZ image;
converting the DZ image to a vector embedding;
performing a similarity search on a vector database using the vector embedding, the vector database storing reference images of other delivery destinations indexed to reference vector embeddings and outcome attributes describing delivery outcomes associated with the reference images, and wherein the similarity search identifies a subset of the reference images of the other delivery destinations deemed to have a threshold similarity to the DZ image; and prompting a vision language model (VLM) with the DZ image, or an encoding thereof, and with the subset of the reference images, or encodings thereof, to provide an abort explanation or to determine a delivery disposition for the DZ.

2. The computer implemented method of claim 1, further comprising:

updating a fleet delivery status or a fleet delivery protocol associated with the delivery destination based upon at least one of the abort explanation or the delivery disposition from the VLM for the DZ.

3. The computer implemented method of claim 2, wherein updating the fleet delivery status associated with the delivery destination includes:

blocking future UAV deliveries to the delivery destination by the UAV delivery service.

4. The computer implemented method of claim 2, wherein updating the fleet delivery protocol associated with the delivery destination includes:

changing a detection threshold or a detection bias associated with a semantic segmentation model operating onboard UAVs of the UAV delivery service when delivering future packages to the delivery destination.

5. The computer implemented method of claim 4, wherein changing the detection threshold or the detection bias associated with the semantic segmentation model comprises:

down weighting powerline detections by the semantic segmentation model above the DZ at the delivery destination.

6. The computer implemented method of claim 1, further comprising:

informing a customer associated with the delivery destination, via a mobile application or a website, that the delivery mission was aborted;

providing at least one of the abort explanation or the delivery disposition to the customer; and soliciting feedback from the customer on the abort explanation or the delivery disposition via the mobile application or the website.

7. The computer implemented method of claim 6, wherein soliciting the feedback from the customer comprises:

presenting the customer with one or more multiple choice options describing the abort explanation or the delivery disposition.

8. The computer implemented method of claim 6, further comprising:

negotiating, via the mobile application or the website, an alternative DZ at the delivery destination with the customer for future deliveries to the delivery destination by the UAV delivery service.

9. The computer implemented method of claim 6, further comprising:

informing the customer that the abort was a mistake when the VLM determines that the DZ was obstructed by a false positive obstruction; and automatically rescheduling the delivery mission to deliver the package.

10. The computer implemented method of claim 1, further comprising:

adding the DZ image and the vector embedding to the vector database; and using the abort explanation or the delivery disposition from the VLM to create new outcome attributes associated with the DZ image and the vector embedding in the vector database.

11. The computer implemented method of claim 1, further comprising:

adding the DZ image to a training database storing training images for training at least one machine learning model used by the UAV delivery service; and using the abort explanation or the delivery disposition to label the DZ image with one or more ground truth labels.

12. At least one machine-readable storage medium having instructions stored thereon that, in response to execution by an unmanned aerial vehicle (UAV) delivery system, cause the UAV delivery system to perform operations comprising:

acquiring a delivery zone (DZ) image, wherein the DZ image is of a delivery destination including a DZ for delivering a package to the delivery destination;

determining to abort a delivery mission for the package prior to delivering the package;

converting the DZ image to a vector embedding;

performing a similarity search on a vector database using the vector embedding, the vector database storing reference images of other delivery destinations indexed to reference vector embeddings and outcome attributes describing delivery outcomes associated with the reference images, and wherein the similarity search identifies a subset of the reference images of the other delivery destinations deemed to have a threshold similarity to the DZ image; and prompting a vision language model (VLM) with the DZ image, or an encoding thereof, and with the subset of the reference images, or encodings thereof, to provide an abort explanation or to determine a delivery disposition for the DZ.

13. The at least one machine-readable storage medium of claim 12, wherein the operations further comprise:

updating a fleet delivery status or a fleet delivery protocol associated with the delivery destination based upon at least one of the abort explanation or the delivery disposition from the VLM for the DZ.

14. The at least one machine-readable storage medium of claim 13, wherein updating the fleet delivery status associated with the delivery destination includes:

blocking future UAV deliveries to the delivery destination by the UAV delivery service.

15. The at least one machine-readable storage medium of claim 13, wherein updating the fleet delivery protocol associated with the delivery destination includes:

changing a detection threshold or a detection bias associated with a semantic segmentation model operating onboard UAVs of the UAV delivery service when delivering future packages to the delivery destination.

16. The at least one machine-readable storage medium of claim 12, wherein the operations further comprise:

informing a customer associated with the delivery destination, via a mobile application or a website, that the delivery mission was aborted;

providing at least one of the abort explanation or the delivery disposition to the customer; and soliciting feedback from the customer on the abort explanation or the delivery disposition via the mobile application or the website.

17. The at least one machine-readable storage medium of claim 16, wherein the operations further comprise:

negotiating, via the mobile application or the website, an alternative DZ at the delivery destination with the customer for future deliveries to the delivery destination by the UAV delivery service.

18. The at least one machine-readable storage medium of claim 16, wherein the operations further comprise:

informing the customer that the abort was a mistake when the VLM determines that the DZ was obstructed by a false positive obstruction; and automatically rescheduling the delivery mission to deliver the package.

19. The at least one machine-readable storage medium of claim 12, wherein the operations further comprise:

adding the DZ image and the vector embedding to the vector database; and using the abort explanation or the delivery disposition from the VLM to create new outcome attributes associated with the DZ image and the vector embedding in the vector database.

20. A computer implemented method performed by an unmanned aerial vehicle (UAV) delivery service, the computer implemented method comprising:

acquiring a delivery zone (DZ) image, wherein the DZ image is of a delivery destination including a DZ for delivering a package to the delivery destination;

converting the DZ image to a vector embedding;

performing a similarity search on a vector database using the vector embedding, the vector database storing reference images of other delivery destinations indexed to reference vector embeddings and outcome attributes describing delivery outcomes associated with the reference images, and wherein the similarity search identifies a subset of the reference images of the other delivery destinations deemed to have a threshold similarity to the DZ image; and prompting a vision language model (VLM) with the DZ image, or an encoding thereof, and with the subset of the reference images, or encodings thereof, to provide an abort explanation of why the package is not delivered at the DZ or to determine a delivery disposition for the DZ.

\* \* \* \* \*